(No Model.)
C. P. COTTRELL.
TOOTHED RACK FOR PRINTING OR OTHER MACHINES.
No. 574,195.　　　　　　　　Patented Dec. 29, 1896.
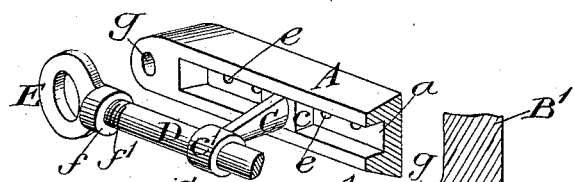
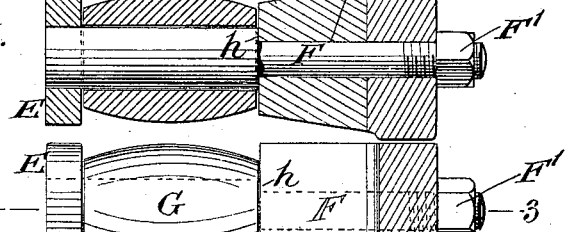
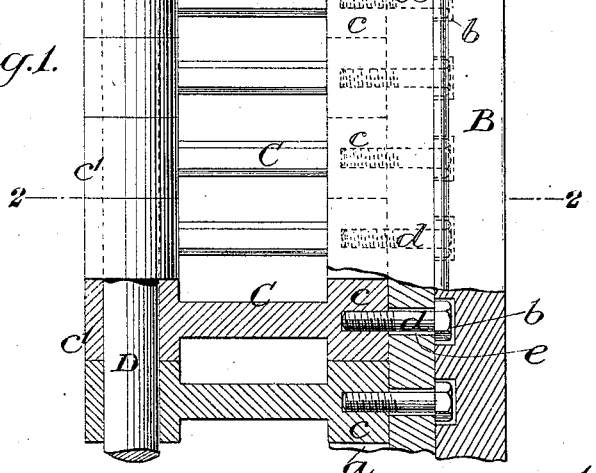
Witnesses:—
George Barry Jr.
M. E. Fletcher
Inventor:—
Charles P. Cottrell
by attorney
Brown & Seward

UNITED STATES PATENT OFFICE.

CHARLES P. COTTRELL, OF STONINGTON, CONNECTICUT, ASSIGNOR TO THE C. B. COTTRELL & SONS COMPANY, OF SAME PLACE AND NEW YORK, N. Y.

TOOTHED RACK FOR PRINTING OR OTHER MACHINES.

SPECIFICATION forming part of Letters Patent No. 574,195, dated December 29, 1896.

Application filed October 21, 1896. Serial No. 609,515. (No model.)

*To all whom it may concern:*

Be it known that I, CHARLES P. COTTRELL, of Stonington, in the county of New London and State of Connecticut, have invented a new and useful Improvement in Toothed Racks for Printing or other Machines, of which the following is a specification.

This invention relates particularly to what is known as a "mangle-rack," such as is commonly used in that class of printing-machines in which a reciprocating movement is given to the type-bed by a pinion known as a "mangle-pinion" engaging with said rack on its upper and lower sides alternately. Such racks as heretofore commonly constructed have the teeth solid with the rack-bar, and it has been difficult to dress them to a proper profile to correspond with the teeth of the pinion working between them, and, moreover, it has been difficult to replace the teeth in case of fracture or damage thereto; but according to the present invention each tooth is of one piece, separate from the others, and can be separately dressed to a proper profile by suitable machinery before incorporating it into the rack, and after it has been incorporated thereinto may be easily removed therefrom in case of breakage or damage and replaced by a new one.

The improvement consists in the novel combinations, hereinafter described and claimed, of which such teeth form elements.

Figure 1 represents a plan view, partly in section, of a portion of a rack embodying my invention and a portion of the hanger by which it is attached to the bed. Fig. 2 represents a transverse section in the line 2 2 of Fig. 1; Fig. 3, a transverse section in the line 3 3 of Fig. 1. Fig. 4 is a skeleton view in perspective illustrating the mode of assembling the parts of which the rack is composed.

Similar letters of reference designate corresponding parts in all the figures.

A is a bar which forms the body of the rack. B B' is the hanger, to which the said bar may be bolted or secured in any suitable manner and which may be like the hanger commonly used in printing-machines for carrying the mangle-rack. The bar A is grooved lengthwise, as shown at $a$, for the reception of the stocks $c$ of the separate teeth C, the groove being represented as square, and the stocks $c$ being represented as of corresponding form. The teeth C may have their operating parts of any suitable form to engage with the mangle-pinion—for example, the form commonly employed. Each is composed of a separate piece having the stock $c$ at one end and an eye $c'$ at the other end. The stocks $c$ have a thickness in a direction lengthwise of the rack equal to the pitch of the rack, so that they fit close together, as shown in Fig. 1, within the groove $a$, and so serve to properly space the teeth, and each tooth is secured to the bar A by a separate screw-bolt $d$, inserted through one of a number of properly-spaced holes $e$ in the bar A from the back thereof and screwing into the stock $c$. The heads of the bolts $d$ are received within recesses $b$ within the hanger. The eyes $c'$ have the same thickness as the stocks $c$ in the direction of the length of the rack, so that the teeth are properly spaced at both ends.

Through the eyes $c'$ of the several teeth there is inserted a bolt or bar D, furnished at each end with an eye E. One of these eyes might be permanently formed on the bolt or bar; but one, at least, should have formed with it a nut $f$, which is fitted to a screw-thread $f'$ on the bolt or bar for the purpose of clamping the eyes $c'$ of the teeth firmly together.

Near each end of the rack-bar A there is a hole $g$, which receives a stud F, which also passes through the eye E on the corresponding end of the bolt or bar D, the said stud carrying the roller G, which serves to conduct the mangle-pinion from and to the upper and lower sides of the rack, respectively. This stud is shouldered at $h$ against the face of the rack-bar to form a screw-bolt the screwed end of which projects through the hanger and is furnished with a nut F', which serves not only to hold the stud in place, but assists in securing the rack to the hanger. The said stud by passing through the eye E also serves to lock the nut F' on the bar or bolt D.

It will be seen that the teeth C are not only firmly secured to the rack-bar by the bolts $d$ $d$, but that, their square stocks being fitted close together within the groove and their eyes $c'$ being clamped close together by the bolt or rod D, they are doubly secured against lateral or vertical displacement. The rack is thus made in all respects firm and solid, and in fact it is much stronger than the ordinary rack having its teeth integral with it.

What I claim as my invention is—

1. In a mangle-rack the combination of a bar in which is a longitudinal groove, separate teeth each having at one end a stock fitted to the said groove and having at the other end an eye, a clamping bar or bolt passing through the eyes of the several teeth for clamping them together, and screw-bolts one for each tooth inserted through holes provided in the said grooved bar and screwing into the stocks of the teeth, substantially as herein described.

2. The combination of a rack-bar in which is a longitudinal groove, separate teeth each having at one end a stock fitted to the said groove and having at the other end an eye, a screw-threaded clamping-bolt passing through the eyes of the several teeth, a nut on said bolt having provided on it an eye, a roller between the last-mentioned eye and the rack-bar, a hanger for the rack-bar, and a bolt which passes through the latter eye and through a hole in the rack-bar and which constitutes both a pivot for said roller and a means for securing the rack-bar to the hanger, substantially as herein described.

CHARLES P. COTTRELL.

Witnesses:
FREDK. HAYNES,
EDWARD VIESER.